United States Patent
Zaum et al.

(10) Patent No.: US 11,285,972 B2
(45) Date of Patent: Mar. 29, 2022

(54) METHOD AND DEVICE FOR OPERATING AN AUTOMATED VEHICLE BASED ON A VALIDITY OF A PLANNING MAP

(71) Applicant: Robert Bosch GmbH, Stuttgart (DE)

(72) Inventors: Daniel Zaum, Sarstedt (DE); Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 143 days.

(21) Appl. No.: 16/645,853

(22) PCT Filed: Aug. 22, 2018

(86) PCT No.: PCT/EP2018/072622
§ 371 (c)(1),
(2) Date: Mar. 10, 2020

(87) PCT Pub. No.: WO2019/052793
PCT Pub. Date: Mar. 21, 2019

(65) Prior Publication Data
US 2020/0262451 A1   Aug. 20, 2020

(30) Foreign Application Priority Data

Sep. 14, 2017   (DE) .......................... 102017216263.5

(51) Int. Cl.
*B60W 60/00*   (2020.01)
*G01C 21/34*   (2006.01)
*G05D 1/00*   (2006.01)

(52) U.S. Cl.
CPC ..... *B60W 60/0053* (2020.02); *G01C 21/3407* (2013.01); *G05D 1/0061* (2013.01); *G05D 1/0088* (2013.01); *G05D 2201/0213* (2013.01)

(58) Field of Classification Search
CPC .......... B60W 60/0053; G01C 21/3407; G05D 1/0061; G05D 1/0088; G05D 2201/0213
See application file for complete search history.

(56) References Cited

U.S. PATENT DOCUMENTS 9,981,657 B2 *  5/2018  Joyce ..................... B60W 50/02
9,989,963 B2 *  6/2018  Perkins ............. B60W 60/0055
(Continued)

FOREIGN PATENT DOCUMENTS

DE   102008053531 A1   5/2009
DE   102013210395 A1   12/2014
(Continued)

OTHER PUBLICATIONS

International Search Report for PCT/EP2018/072622, dated Nov. 26, 2018.

*Primary Examiner* — Ramsey Refai
(74) *Attorney, Agent, or Firm* — Norton Rose Fulbright US LLP; Gerard Messina

(57) ABSTRACT

A method and a device for operating an automated vehicle, including: determining a position of the automated vehicle, detecting at least one surroundings feature in the surroundings of the automated vehicle, reading in a planning map depending on the position of the automated vehicle, the planning map being configured for determining a first driving function for operating the automated vehicle, determining a validity of the planning map depending on the position of the automated vehicle depending on the at least one surroundings feature, and operating the automated vehicle depending on the validity of the planning map.

8 Claims, 2 Drawing Sheets

(56) References Cited

U.S. PATENT DOCUMENTS

| | | | |
|---|---|---|---|
| 10,026,317 B2 * | 7/2018 | Perkins | G01S 17/87 |
| 10,719,886 B1 * | 7/2020 | Konrardy | G06Q 40/08 |
| 2011/0241862 A1 * | 10/2011 | Debouk | B60W 50/035 |
| | | | 340/439 |
| 2014/0244096 A1 | 8/2014 | An et al. | |

FOREIGN PATENT DOCUMENTS

| | | |
|---|---|---|
| DE | 102014013672 A1 | 4/2015 |
| DE | 102015220695 A1 | 4/2017 |

\* cited by examiner

METHOD AND DEVICE FOR OPERATING AN AUTOMATED VEHICLE BASED ON A VALIDITY OF A PLANNING MAP

FIELD OF THE INVENTION

The present invention relates to a method and a device for operating an automated vehicle, including a step of determining a position of the automated vehicle, a step of detecting at least one surroundings feature in the surroundings of the automated vehicle, a step of reading in a planning map, a step of determining a validity of the planning map, and a step of operating the automated vehicle depending on the validity of the planning map.

SUMMARY OF THE INVENTION

The method according to the present invention for operating an automated vehicle includes a step of determining a position of the automated vehicle, a step of detecting at least one surroundings feature in the surroundings of the automated vehicle, and a step of reading in a planning map depending on the position of the automated vehicle, the planning map being configured for determining a first driving function for operating the automated vehicle. Moreover, the method according to the present invention includes a step of determining a validity of the planning map depending on the position of the automated vehicle depending on the at least one surroundings feature, and a step of operating the automated vehicle depending on the validity of the planning map.

An automated vehicle is understood to mean a semi, highly, or fully automated vehicle. An operation of the automated vehicle is understood to mean that the automated vehicle is operated in a semi, highly, or fully automated manner. The operation encompasses, for example, determining a trajectory for the automated vehicle and/or following the trajectory with the aid of an automated lateral and/or longitudinal control and/or carrying out safety-relevant driving functions, etc.

A position of the automated vehicle is understood to mean a position, which is indicated within a predefined coordinate system, for example, GNSS coordinates. The position encompasses, for example, position information in the form of GPS coordinates as well as a lack of definition of these coordinates.

The surroundings of the automated vehicle is understood to mean, for example, an area, which may be detected with the aid of a surroundings sensor system of the vehicle.

A surroundings sensor system is understood to mean, for example, at least one video sensor and/or at least one radar sensor and/or at least one LIDAR sensor and/or at least one ultrasonic sensor and/or at least one further sensor, which is configured for detecting the surroundings of the automated vehicle.

A planning map is understood to mean, for example, a digital map, which is configured for localizing the automated vehicle, for example, in connection with a navigation system and/or a control unit of the automated vehicle and/or in connection with a smartphone, which is connected to or is encompassed by the automated vehicle, and/or for carrying out a (driving) function depending on the localization, etc.

The method according to the present invention solves the problem, in an advantageous way, that a safe and reliable operation of an automated vehicle depends, in many cases, on the knowledge of a position of the automated vehicle—on its localization—or on a precise knowledge of the surroundings of the automated vehicle, both taking place, for example, with the aid of a planning map—which may also be configured as a localization map—which is encompassed by the automated vehicle. The method described here checks the validity of this planning map and operates the vehicle depending on this validity. This increases the safety for the automated vehicle, its occupants, and all further road users in the surroundings of the automated vehicle.

A step of determining a second driving function for operating the automated vehicle may be provided if the validity of the planning map is determined not to be valid, the second driving function being determined independently of the planning map and the operation of the automated vehicle taking place depending on the second driving function.

Herein lies the advantage that the automated vehicle is also safely operated if the planning map is not valid.

The determination of the second driving function may take place depending on the at least one surroundings feature.

A surroundings feature in the surroundings of the automated vehicle is, for example, an infrastructure feature (roadway marking, traffic signs, intersections, illumination devices, etc.) and/or a structure (buildings, bridges, tunnels, etc.) and/or a landscape feature (mountains, lakes, forests, rivers, etc.).

Herein lies the advantage that the surroundings of the automated vehicle, which have a substantial effect on safety and reliability during the operation of the automated vehicle, are taken into account.

The second driving function may provide for a take-over of the automated vehicle by an operator of the automated vehicle.

An operator of the automated vehicle is understood to mean, for example, a driver. In one further specific embodiment, an operator is understood to mean, for example, a central control station, which carries out the operation, for example, with the aid of a radio link.

Herein lies the advantage that the automated vehicle is also safely operated if an automated operation is not possible.

The validity of the planning map may be determined not to be valid depending on at least one performance feature of at least one operating system of the automated vehicle.

An operating system of the automated vehicle is understood to mean, for example, a control unit or a composite of multiple control units, which are configured for operating the automated vehicle.

A performance feature is understood to mean, for example, a minimum requirement of an operating system on the planning map (accuracy, level of detail, etc.).

Herein lies the advantage that, for example, vehicle-specific features are also taken into account, which are of particular significance for a safe operation of the automated vehicle.

The validity of the planning map may be determined not to be valid depending on at least one further vehicle in the surroundings of the automated vehicle.

Herein lies the advantage that further road users are also taken into account, since precisely the interaction of an (automated) vehicle with further vehicles is of particular significance for a safe operation.

The device according to the present invention for operating an automated vehicle encompasses a first apparatus/device (arrangement) for determining a position of the automated vehicle, a second apparatus/device (arrangement)

for detecting at least one surroundings feature in the surroundings of the automated vehicle, and a third apparatus/device (arrangement) for reading in a planning map depending on the position of the automated vehicle, the planning map being configured for determining a first driving function for operating the automated vehicle. Moreover, the device according to the present invention encompasses a fourth apparatus/device (arrangement) for determining a validity of the planning map depending on the position of the automated vehicle depending on the at least one surroundings feature, and a fifth apparatus/device (arrangement) for operating the automated vehicle depending on the validity of the planning map.

A further apparatus/device (arrangement) may be provided for determining a second driving function for operating the automated vehicle if the validity of the planning map is determined not to be valid, the second driving function being determined depending on the planning map.

The first apparatus/device (arrangement) and/or the second apparatus/device (arrangement) and/or the third apparatus/device (arrangement) and/or the fourth apparatus/device (arrangement) and/or the fifth apparatus/device (arrangement) and/or the further apparatus/device (arrangement) may be configured for carrying out a method according to at least one of the methods described herein.

Advantageous refinements of the present invention are stated in the further descriptions herein and are set forth in the description.

Exemplary embodiments of the present invention are represented in the drawings and are explained in greater detail in the following descriptions.

DETAILED DESCRIPTION

Figure 1:
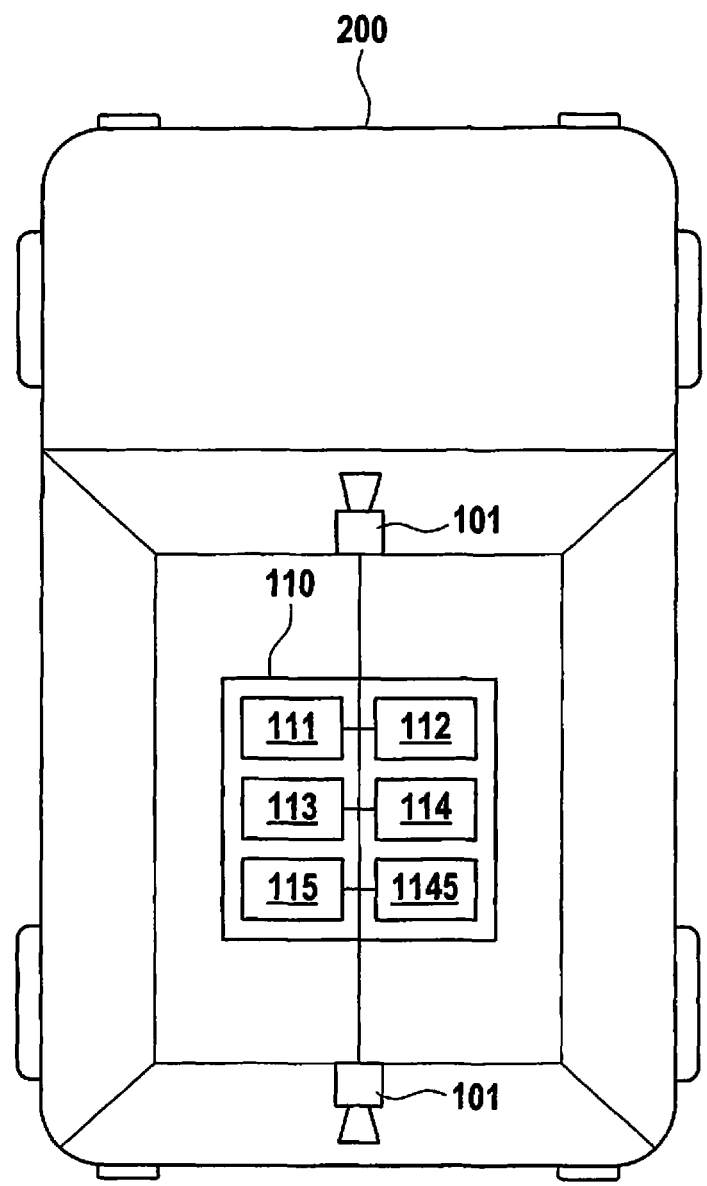
FIG. 1 shows an exemplary embodiment of the device according to the present invention.

FIG. 1 shows an automated vehicle 200, which encompasses device 110 according to the present invention for operating 350 automated vehicle 200.

Device 110 encompasses first apparatus/device (arrangement) 111 for determining 310 a position of automated vehicle 200, second apparatus/device (arrangement) 112 for detecting 320 at least one surroundings feature in the surroundings of automated vehicle 200, and third apparatus/device (arrangement) 113 for reading in 330 a planning map depending on the position of automated vehicle 200, the planning map being configured for determining a first driving function for operating 350 automated vehicle 200. Moreover, the device encompasses fourth apparatus/device (arrangement) 114 for determining 340 a validity of the planning map depending on the position of automated vehicle 200 depending on the at least one surroundings feature, and fifth apparatus/device (arrangement) 115 for operating 350 automated vehicle 200 depending on the validity of the planning map.

In one further specific embodiment, device 110 additionally encompasses further apparatus/device (arrangement) 1145 for determining 345 a second driving function if the validity of the planning map is determined not to be valid.

First apparatus/device (arrangement) 111 for determining 310 a position of automated vehicle 200 are configured, for example, as a navigation system. In one further specific embodiment, first apparatus/device (arrangement) 111 are configured, for example, as a smartphone, which is encompassed by automated vehicle 200 and is connected to automated vehicle 200 with the aid of cables and/or with the aid of a wireless connection (for example, Bluetooth).

Second apparatus/device (arrangement) 112 for detecting 320 at least one surroundings feature in the surroundings of automated vehicle 200 are configured, for example, as a surroundings sensor system 101.

Third apparatus/device (arrangement) 113 for reading in 330 a planning map depending on the position of automated vehicle 200, the planning map being configured for determining a first driving function for operating 350 automated vehicle 200, are configured, for example, as a processing unit and/or control unit—processor, working memory, memory unit, appropriate software—the planning map being encompassed by the memory unit as a digital map. In one further specific embodiment, third apparatus/device (arrangement) 113 are, for example, an integral part of first apparatus/device (arrangement) 111 (navigation system and/or smartphone). In one further specific embodiment, third apparatus/device (arrangement) 113 are configured, for example, as a transmitting and/or receiving unit, with which to retrieve and receive the planning map or an appropriate section of the planning map from an external server, for example, a map provider. In one further specific embodiment, third apparatus/device (arrangement) 113 are configured, for example, as a smartphone, which is encompassed by automated vehicle 200 and is connected to automated vehicle 200 with the aid of cables and/or with the aid of a wireless connection (for example, Bluetooth). In one further specific embodiment, first apparatus/device (arrangement) 111 and third apparatus/device (arrangement) 113 are identical.

Fourth apparatus/device (arrangement) 114 for determining 340 a validity of the planning map depending on the position of automated vehicle 200 depending on the at least one surroundings feature are configured, for example, as a processing unit and/or control unit—processor, working memory, memory unit, appropriate software—the software being encompassed by the memory unit and being configured for determining the validity of the planning map.

In one specific embodiment, the validity of the planning map is determined, for example, in that a check is carried out to determine whether the at least one surroundings feature, which is detected with the aid of second apparatus/device (arrangement) 112, is also encompassed by the planning map. In the process, the validity of the planning map is determined not to be valid, for example, depending on at least one performance feature of at least one operating system of automated vehicle 200, if the at least one operating system requires the at least one surroundings feature in the planning map in order to operate automated vehicle 200 starting from this at least one surroundings feature (for example, to determine a trajectory, along which automated vehicle 200 moves).

In one further specific embodiment, the validity of the planning map is determined, for example, not to be valid if the at least one surroundings feature is detected with the aid of second apparatus/device (arrangement) 112 at a point other than the at least one surroundings feature is assumed due to the planning map.

In one further specific embodiment, the validity of the planning map is, for example, additionally determined in that the planning map includes a time stamp (date and/or time of day) and this time stamp is compared with an instantaneous date and/or an instantaneous time of day in automated vehicle 200, for example, encompassing a navigation system and/or encompassing a smartphone (see above) and/or encompassing a multimedia unit.

In one further specific embodiment, the validity of the planning map is determined not to be valid, for example, depending on at least one further vehicle in the surroundings of automated vehicle 200. This takes place, for example, if an operation 350 of automated vehicle 200 depending on the planning map is not possible, since the at least one further vehicle blocks the roadway and/or approaches automated vehicle 200 in a dangerous way. The at least one further vehicle is detected, for example, with the aid of second apparatus/device (arrangement) 112.

Fifth apparatus/device (arrangement) 115 for operating 350 automated vehicle 200 depending on the validity of the planning map are configured, for example, as a control unit, the control unit controlling, for example, the lateral and/or longitudinal control of automated vehicle 200. In one specific embodiment, this control unit controls, for example, safety-relevant functions of automated vehicle 200 (for example, an "arming" of an airbag, an initiation of an emergency braking, an activation of at least one (warning) flasher, etc.)

Further apparatus/device (arrangement) 1145 for determining 345 a second driving function if the validity of the planning map is determined not to be valid is configured, for example, as a processing unit and/or control unit—processor, working memory, memory unit, appropriate software—the software being encompassed by the memory unit and being configured for determining a second driving function.

In one specific embodiment, the second driving function is determined, for example, in such a way that the second driving function provides for a trajectory for automated vehicle 200, which is determined starting from the at least one surroundings feature and not starting from the planning map.

Figure 2:
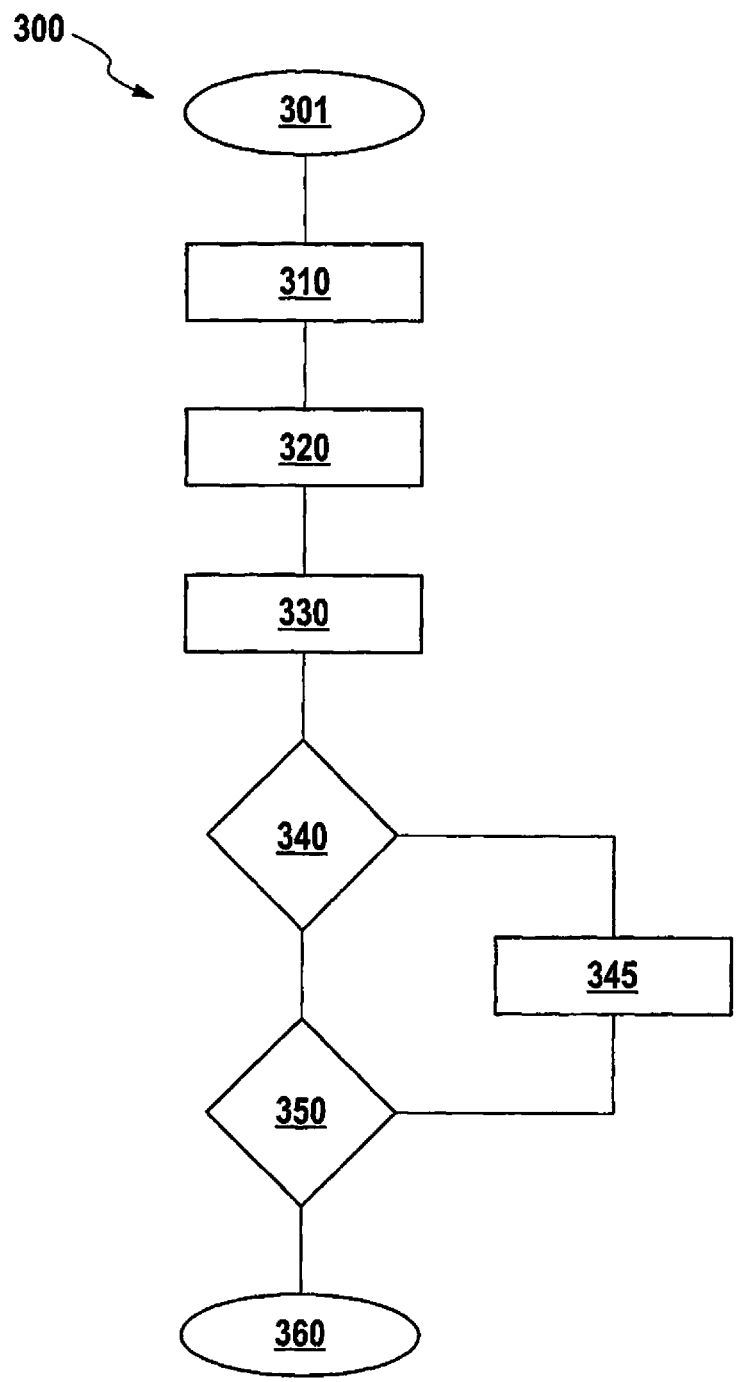
FIG. 2 shows an exemplary embodiment of the method according to the present invention in the form of a flow chart.

FIG. 2 shows an exemplary embodiment of a method 300 for operating 350 an automated vehicle 200.

Method 300 starts in step 301.

In step 310, a position of the automated vehicle is determined.

In step 320, at least one surroundings feature in the surroundings of automated vehicle 200 is detected.

In step 330, a planning map is read in depending on the position of automated vehicle 200, the planning map being configured for determining a first driving function for operating automated vehicle 200.

In step 340, a validity of the planning map is determined depending on the position of automated vehicle 200 depending on the at least one surroundings feature. If the validity of the planning map is determined to be valid, step 350 takes place. If the validity of the planning map is determined not to be valid, step 345 takes place.

In step 345, a second driving function for operating 350 automated vehicle 200 is determined, the second driving function being determined independently of the planning map.

In step 350, the automated vehicle is operated depending on the validity of the planning map. In the process, automated vehicle 200 is operated, for example, with the aid of the first driving function, if the validity of the planning map is determined to be valid or is operated with the aid of the second driving function if the validity of the planning map is determined not to be valid.

Method 300 ends in step 360.

What is claimed is:

1. A method for operating an automated vehicle, the method comprising:
    determining a position of the automated vehicle;
    detecting at least one surroundings feature in the surroundings of the automated vehicle;
    reading in a planning map, depending on the position of the automated vehicle, wherein the planning map is configured for determining a first driving function for operating the automated vehicle;
    determining a validity of the planning map, depending on the position of the automated vehicle and/or depending on the at least one surroundings feature; and
    operating the automated vehicle depending on the validity of the planning maps;
    wherein the validity of the planning map is determined by performing a check to determine whether the at least one surroundings feature is also encompassed by the planning map,
    wherein the validity of the planning map is additionally determined in that the planning map includes a time stamp which is compared with an instantaneous date and/or an instantaneous time of day in the automated vehicle, encompassing a navigation system and/or encompassing a smartphone and/or encompassing a multimedia unit,
    wherein the validity of the planning map is determined not to be valid: (i) depending on at least one performance feature of at least one operating system of the automated vehicle, if the at least one operating system requires the at least one surroundings feature in the planning map to operate the automated vehicle starting from the at least one surroundings feature, and/or (ii) if the at least one surroundings feature is detected at a point other than the at least one surroundings feature is assumed due to the planning map.

2. The method of claim 1, further comprising:
    determining a second driving function for operating the automated vehicle, if the validity of the planning map is determined not to be valid, wherein the second driving function is determined independently of the planning map, and wherein the operation of the automated vehicle takes place depending on the second driving function.

3. The method of claim 1, wherein the determination of the second driving function takes place depending on at least one surroundings feature.

4. The method of claim 1, wherein the second driving function provides for a take-over of the automated vehicle by an operator of the automated vehicle.

5. The method of claim 1, wherein the validity of the planning map is determined not to be valid, depending on at least one further vehicle in the surroundings of the automated vehicle.

6. A device for operating an automated vehicle, comprising:
    a first apparatus for determining a position of the automated vehicle;
    a second apparatus for detecting at least one surroundings feature in the surroundings of the automated vehicle;
    a third apparatus for reading in a planning map, depending on the position of the automated vehicle, wherein the planning map is configured for determining a first driving function for operating the automated vehicle;

a fourth apparatus for determining a validity of the planning map, depending on the position of the automated vehicle and/or depending on the at least one surroundings feature; and a fifth apparatus for operating the automated vehicle, depending on the validity of the planning map;

wherein the validity of the planning map is determined by performing a check to determine whether the at least one surroundings feature is also encompassed by the planning map, wherein the validity of the planning map is additionally determined in that the planning map includes a time stamp which is compared with an instantaneous date and/or an instantaneous time of day in the automated vehicle, encompassing a navigation system and/or encompassing a smartphone and/or encompassing a multimedia unit, wherein the validity of the planning map is determined not to be valid: (i) depending on at least one performance feature of at least one operating system of the automated vehicle, if the at least one operating system requires the at least one surroundings feature in the planning map to operate the automated vehicle starting from the at least one surroundings feature, and/or (ii) if the at least one surroundings feature is detected at a point other than the at least one surroundings feature is assumed due to the planning map.

7. The device of claim 6, further comprising:
a further apparatus for determining a second driving function, if the validity of the planning map is determined not to be valid, to operate the automated vehicle, wherein the second driving function is determined independently of the planning map.

8. The device of claim 6, wherein the first apparatus, the second apparatus, the third apparatus, the fourth apparatus, the fifth apparatus, and/or the further apparatus are configured to perform the following:

determining a position of the automated vehicle;

detecting at least one surroundings feature in the surroundings of the automated vehicle;

reading in a planning map, depending on the position of the automated vehicle, wherein the planning map is configured for determining a first driving function for operating the automated vehicle;

determining a validity of the planning map, depending on the position of the automated vehicle and/or depending on the at least one surroundings feature; and operating the automated vehicle depending on the validity of the planning map.

* * * * *